(12) United States Patent
Chiang et al.

(10) Patent No.: US 10,370,066 B2
(45) Date of Patent: Aug. 6, 2019

(54) SEPARABLE BUOY

(71) Applicant: INDUSTRIAL TECHNOLOGY RESEARCH INSTITUTE, Hsin-Chu (TW)

(72) Inventors: Shih-Ying Chiang, Hualien County (TW); Shih-Sheng Hsu, Toufen (TW); Yi-Chieh Huang, Nantou County (TW); Heng-Chu Peng, Hsinchu County (TW); Tzu-Hung Huang, Kaohsiung (TW); Yi-Chen Li, Zhubei (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 90 days.

(21) Appl. No.: 15/379,121

(22) Filed: Dec. 14, 2016

(65) Prior Publication Data

US 2018/0148136 A1 May 31, 2018

(30) Foreign Application Priority Data

Nov. 25, 2016 (TW) .............................. 105138941 A (51) Int. Cl.
*B63B 22/00* (2006.01)
*B63B 22/08* (2006.01)
(Continued)

(52) U.S. Cl.
CPC .............. *B63B 22/00* (2013.01); *B63B 22/08* (2013.01); *F03B 13/14* (2013.01);
(Continued)

(58) Field of Classification Search
CPC ......... B63B 22/00; B63B 22/18; B63B 22/22; B63B 22/24; B63B 22/28;
(Continued)

(56) References Cited

U.S. PATENT DOCUMENTS

| 1,367,225 A | 2/1921 | Barker |
| 1,867,563 A | 7/1932 | Clarke |

(Continued)

FOREIGN PATENT DOCUMENTS

| CN | 2663290 Y | 12/2004 |
| CN | 102536609 A | 7/2012 |

(Continued)

OTHER PUBLICATIONS

AU Office Action dated Mar. 5, 2018.

(Continued)

*Primary Examiner* — Ajay Vasudeva
(74) *Attorney, Agent, or Firm* — Rabin & Berdo, P.C.

(57) ABSTRACT

A separable buoy includes a center float having a top surface that includes an upper peripheral end and an engagement bevel provided on the upper peripheral end that extends below the top surface; a separable float unit detachably disposed at the center float and including a dome wall that is provided in a lower central portion thereof and that has a peripheral edge configured to detachably engage the engagement bevel; and a chamber defined between the dome wall of the separable float unit and the top surface of the center float when the separable float unit engages the center float, wherein the center float has a vertical height that substantially equals or exceeds that of a lower portion of the separable float unit.

11 Claims, 11 Drawing Sheets

(51) Int. Cl.
*B63B 35/44* (2006.01)
*F03B 13/14* (2006.01)

(52) U.S. Cl.
CPC ... *B63B 2035/4466* (2013.01); *F05B 2230/50* (2013.01); *F05B 2240/93* (2013.01); *F05B 2260/30* (2013.01); *Y02E 10/38* (2013.01)

(58) Field of Classification Search
CPC ............. B63B 2035/4466; F03B 13/14; F03B 13/141; F03B 13/148; F03B 13/16; F03B 13/20
USPC .......................................................... 290/53
See application file for complete search history.

(56) References Cited

U.S. PATENT DOCUMENTS

| | | | | |
|---|---|---|---|---|
| 2,422,337 | A | * | 6/1947 | Chilowsky ............... G01V 1/38 367/4 |
| 2,546,956 | A | * | 3/1951 | Yeomans ................ B63B 22/08 114/240 R |
| 3,529,562 | A | | 9/1970 | McLaren |
| 3,570,437 | A | * | 3/1971 | Davis, Jr. ................ B63B 22/20 114/333 |
| 3,631,550 | A | * | 1/1972 | Bullen ................... B63B 22/003 441/25 |
| 3,864,771 | A | * | 2/1975 | Bauer ..................... B63B 22/22 220/8 |
| 3,880,103 | A | | 4/1975 | Talkington |
| 3,918,260 | A | | 11/1975 | Mahneke |
| 3,978,810 | A | * | 9/1976 | Lucht ..................... B63B 22/02 441/3 |
| 4,358,834 | A | * | 11/1982 | Swenson .............. G10K 11/006 367/173 |
| 5,305,703 | A | * | 4/1994 | Korsgaard ............ B63B 22/023 114/230.1 |
| 5,424,582 | A | | 6/1995 | Trepl, II et al. |
| 5,460,556 | A | * | 10/1995 | Logan ..................... B63B 22/18 441/2 |
| 7,223,137 | B1 | | 5/2007 | Sosnowski |
| 7,444,811 | B2 | | 11/2008 | Skotte et al. |
| 7,629,703 | B2 | | 12/2009 | Storbekk |
| 7,632,041 | B2 | | 12/2009 | Jean et al. |
| 8,110,935 | B2 | | 2/2012 | Shin |
| 8,568,180 | B1 | * | 10/2013 | DeHoney ................ B63B 22/02 441/1 |
| 8,817,574 | B2 | * | 8/2014 | Elvestad ................ B63B 21/66 367/16 |
| 2004/0229530 | A1 | | 11/2004 | Gotell |
| 2010/0064679 | A1 | | 3/2010 | Straume |
| 2010/0171312 | A1 | | 7/2010 | Burns |
| 2014/0216325 | A1 | | 8/2014 | Hardy et al. |

FOREIGN PATENT DOCUMENTS

| | | |
|---|---|---|
| CN | 204119003 U | 1/2015 |
| CN | 204623776 U | 9/2015 |
| JP | 2013139255 A | 7/2013 |
| KR | 20100030849 A | 3/2010 |
| TW | 158814 | 5/1991 |
| TW | 201217226 A | 5/2012 |
| TW | I512252 B | 12/2015 |
| WO | WO-2011140196 A2 | 11/2011 |
| WO | WO-2014173456 A1 | 10/2014 |

OTHER PUBLICATIONS

Taiwan Patent Office, Office Action, Patent Application Serial No. TW105138941, dated Nov. 9, 2017, Taiwan.
Straume, Straumekraft AS: Durable and profitable wave power, 3rd International Conference on Ocean Energy, Oct. 6, 2010, pp. 1-6.
China Patent Office, Office Action dated Jan. 22, 2019.

* cited by examiner

SEPARABLE BUOY

CROSS REFERENCE TO RELATED APPLICATION

This application also claims priority to Taiwan Patent Application No. 105138941 filed in the Taiwan Patent Office on Nov. 25, 2016 the entire content of which is incorporated herein by reference.

BACKGROUND

1. Technical Field

The disclosure relates to a separable buoy, and more particularly, to a separable buoy that can mitigate the wave force that is exerted to the wave generator.

2. Related Art

In recent years, environmental issues have gradually been paid much attention by the people and the rate of utilizing the green energy has been gradually increased. The currently existed green energy can roughly be as classified four kinds: solar energy, hydroelectric energy, wind power as well as ocean wave energy.

Limited by the factors such as the land area, sunshine frequency and water resource, ocean energy development has gradually been employed by those states surrounded by vast ocean, for instance, wave power generation by use of wave power generator.

The currently use of wave power generator possesses a floating body and electric generator assemblies. The floating bodies being floated on the sea water surface of partially submerged in the sea water can absorb the sea wave energy to drive the shaft of the electric power generator assembly. The absorbed wave energy, which is transformed into the kinetic energy by letting the wave energy drive the shaft of the generator to rotate, can then be transformed into electric energy or the remaining unused energy can be output in the mode of stored energy output.

Under extreme weather conditions, such as typhoon, hurricane etc., the ocean wave energy can be as huge as 100 times of the energy in normal condition. If one would like to have the electric power generator survive without wrecking its mechanical and electrical structures under these extreme weather conditions, a partially submerged floating body is employed to mitigate the capacity of wave energy that the electric power generator assembly can withstand. A donut-type floating body is also widely used to reduce the cut-water area of the floating body, in floating design, however, the effect is very limited.

SUMMARY

In light of the disadvantages of the prior arts, the disclosure provides a separable buoy that aims to ameliorate at least some of the disadvantages of the prior art or to provide a useful alternative.

The separable buoy of the disclosure employs a design of separable buoy making the wave generator mitigate the wave force that exerts thereon and improve the safety performance thereof. The technical means are as follows:
The disclosure is a separable buoy, comprising:
  a center float;
  a separable float unit detachably furnished at the center float: and a chamber connected to both the center float and the separable float unit.

Another embodiment, the disclosure is a separable buoy, comprising:
  a center float; and
  a separable float unit, further comprising:
    a center plate;
      at least a connecting module, furnished at the center plate, the at least a connecting module clamps the center float; and
      a floating body, clamped by the at least a connecting module.

Another embodiment, the disclosure is a separable buoy, comprising:
  a center float having a deformable connecting ring; and
  a separable float unit having a containing hole for furnishing the center float, and the deformable connecting ring is leaned against the inner wall of the containing hole.

Another embodiment, the disclosure is a separable buoy, comprising:
  a center float; and
  a separable float unit having a multiplicity of floating bodies is circumferentially furnished at the center float.

BRIEF DESCRIPTION OF THE DRAWINGS

The accomplishment of this and other objects of the disclosure will become apparent from the following description and its accompanying drawings of which.

DETAILED DESCRIPTION OF THE DISCLOSED EMBODIMENT

The following descriptions are embodiments of the disclosure employing some particular concrete examples. Those people skilled in the art are capable of easily realizing the advantages and efficacies of the disclosure through the content disclosed by the patent specification of the disclosure.

Figure 1:
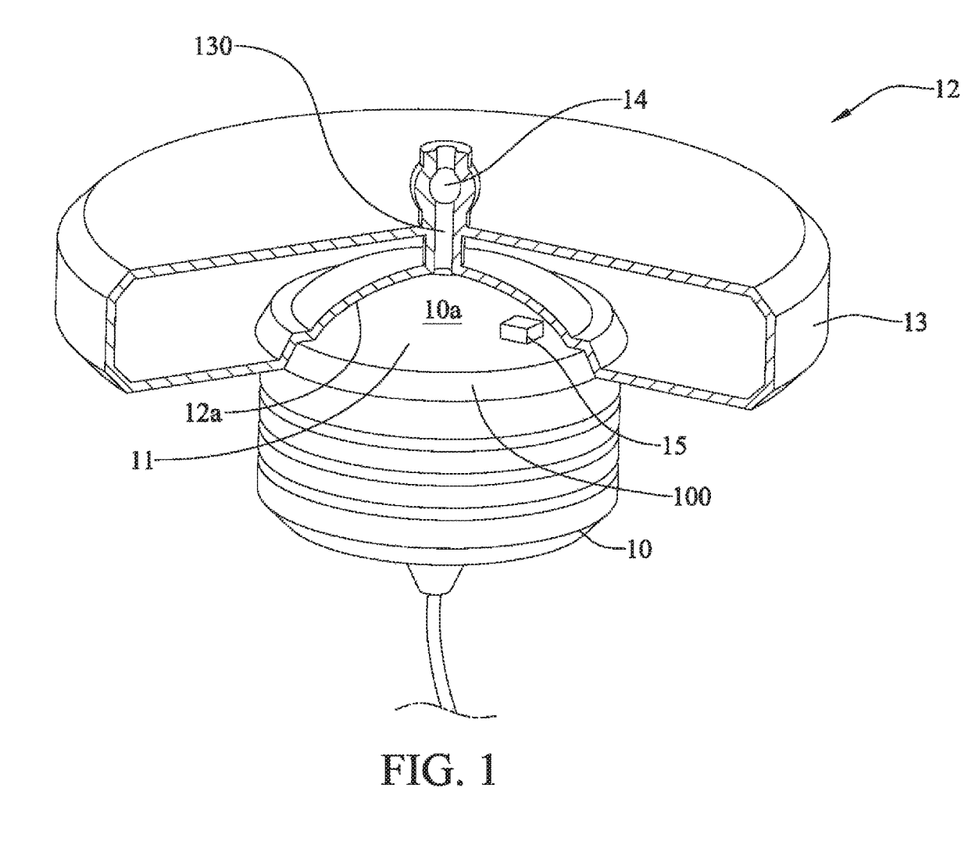
FIG. 1 is a schematic isometric drawing showing the outward appearance of the separable buoy of the first embodiment of the disclosure.

FIG. 1 is a schematic isometric drawing showing the outward appearance of the separable buoy of the first embodiment of the disclosure. As shown in FIG. 1, the separable buoy of the disclosure includes center float 10 and a separable float unit 12.

The center float 10 is coupled to a cable 101 to make it to be floated on the surface of the sea water or partially submerged in the sea water. An engagement bevel 100 is designed at the edge of the circumference at the top end of the center float 10. The generator assembly of the sea wave generator is furnished at the center float 10.

The separable float unit 12 is detachably furnished at the top end of the center float 10 while the bottom end of the separable float unit 12 is stuck to the engagement bevel 100.

The separable float unit 12 includes a floating body 13, a actuation module 14 and a sensing module 15.

The floating body 13 being a rigid body possesses an air hole 130. A lower recess 213, i.e., dome wall 12a in FIG. 1, being provided by the floating body 13 is communicated to the air hole 130. A chamber 11 is formed between the lower recess 213, i.e., the dome wall 12a and a top surface 10a of the center float 10 when the floating body 13 is combined with, i.e., engages, the center float 10. An air-discharge unit is used to perform air-discharge action with respect to the chamber 11 through the air hole 130 to let the chamber 11 become a low-pressure chamber 11 so as to make the separable float unit 12 tightly combine with the floating body 13 and let them become an integral body.

As a low-pressure chamber 11, it has a pressure lower that that of the atmosphere, for example, if the pressure in the low-pressure chamber 11 is 0.5 atm with 2.5 meter in diameter of the chamber 11, then an experimentally result shows that at least a 250 KN of force is required to separate the integral body of the combination of the separable float unit 12 and the center float 10.

The actuation module 14 being furnished at the air hole 130 is an explosive, an air-discharge valve, a electromagnetic valve, an actuator, an active air-discharge valve or a passive air-discharge valve. The sensing module 15 being furnished in the chamber 11 or at the top end of the center float 10 and being signally connected to the actuation module 14 is a pressure sensor or an accelerometer.

The actuation module 14 can close the air hole 130 to make the external air unable to enter the chamber 11 so as to make the chamber 11 in a low-pressure state.

Referring again to FIG. 1, if the drag force exerted by the wave force exceeds the combination force between the separable float unit 12 and the center float 10, the separable float unit 12 and the center float 10 will be separated each other automatically. Similarly, if the wave energy or wave velocity stored in the wave, that is sensed by the sensing module 15, exceeds that of the tolerated limit of electric generator, the actuation module 14 will make the chamber 11 to be communicated with the atmosphere to balance the low-pressure chamber 11 with the atmospheric causing the separable float unit 12 and the center float 10 separate automatically from each other. The pressure of a normal pressure chamber as depicted here is equal to or greater than one atmospheric pressure.

Figure 2:
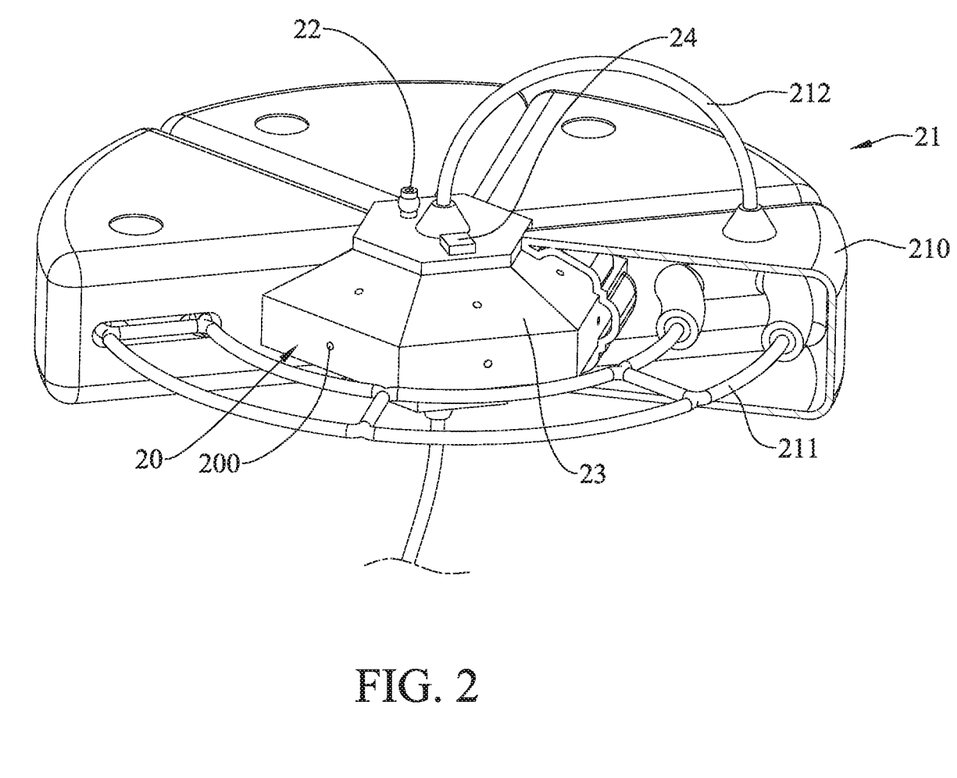
FIG. 2 is a schematic isometric drawing showing the outward appearance of the separable buoy of the second embodiment of the disclosure.
Figure 3:
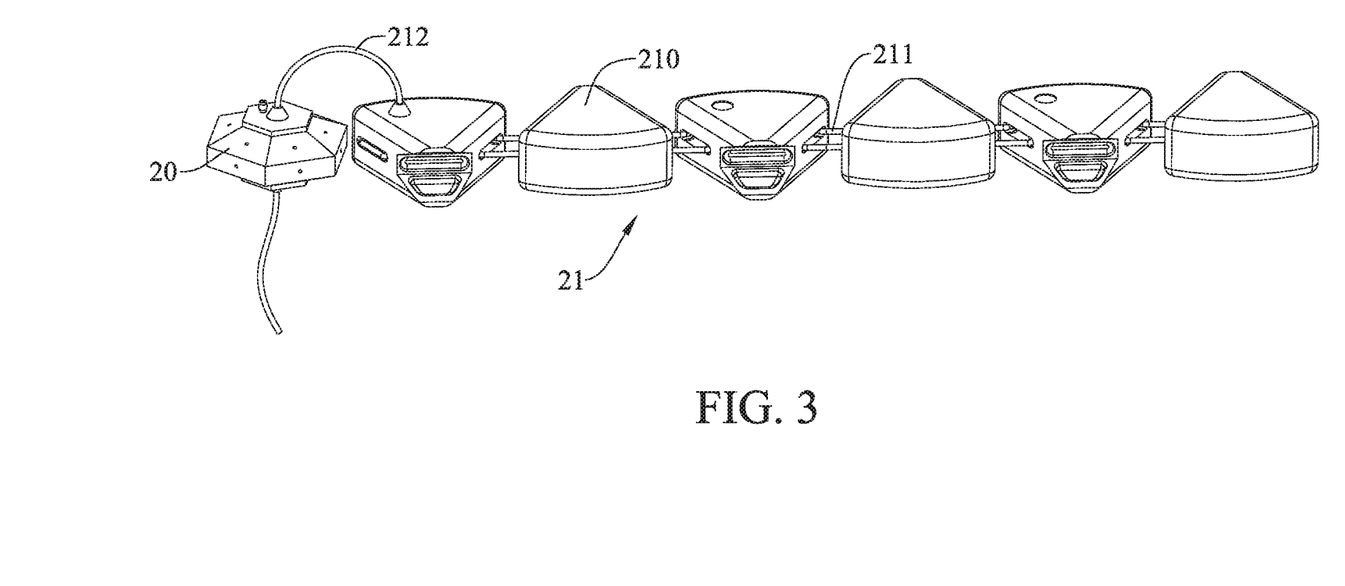
FIG. 3 is a schematic isometric drawing showing the developed view of the separable buoy of the second embodiment of the disclosure.

FIG. 2 is a schematic isometric drawing showing the outward appearance of the separable buoy of the second embodiment of the disclosure; FIG. 3 is a schematic isometric drawing showing the developed view of the separable buoy of the second embodiment of the disclosure. As shown in FIG. 2 and FIG. 3, the separable buoy of the disclosure includes center float 20 and a separable float unit 21.

The center float 20 having a multiplicity of air hole 200 which is coupled to a actuation module 22 is coupled to a cable 201 to let the center float 20 float on the surface of the sea water or partially submerge in the sea water.

The separable float unit 21 possesses at least a floating body 210 which are connected in series by at least a connecting body 211 to form a long-chain structure which is also called as floating body chain.

Figure 4:
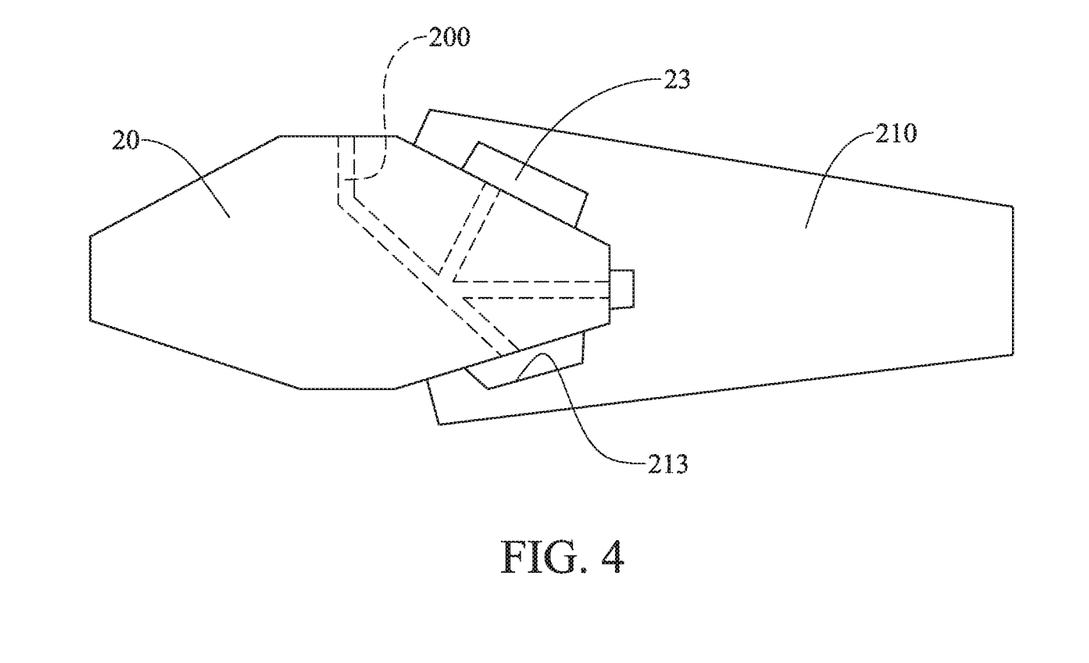
FIG. 4 is a schematic drawing showing the partial cross-sectional view of both the center float and the floating body of the separable buoy of the disclosure.

FIG. 4 is a schematic drawing showing the partial cross-sectional view of both the center float and the floating body of the separable buoy of the disclosure. The floating body 210 possesses three engagement bevels 100 which are inclined one another with each engagement bevel surface having a recess 213. The separable float units 21 are circumferentially furnished at the center float 20, The above-mentioned recess 213 is formed as a chamber 23 which being communicated to the air hole 200 is a closed space.

The actuation module 22 being coupled to the air-discharge unit in order to make the chamber 23 become a low-pressure chamber can close the air hole 200 to make the external air unable to enter the chamber 23 so as to make the chamber 23 maintain in a low-pressure state.

The separable float unit 21 is connected to the center float 20 by the use of a connecting body 212. The connecting body 211, 212 are a cable. a metal chain connecting plate.

A sensing module 24 being furnished at the center float 20 is signally connected to the actuation module 22.

Figure 5:
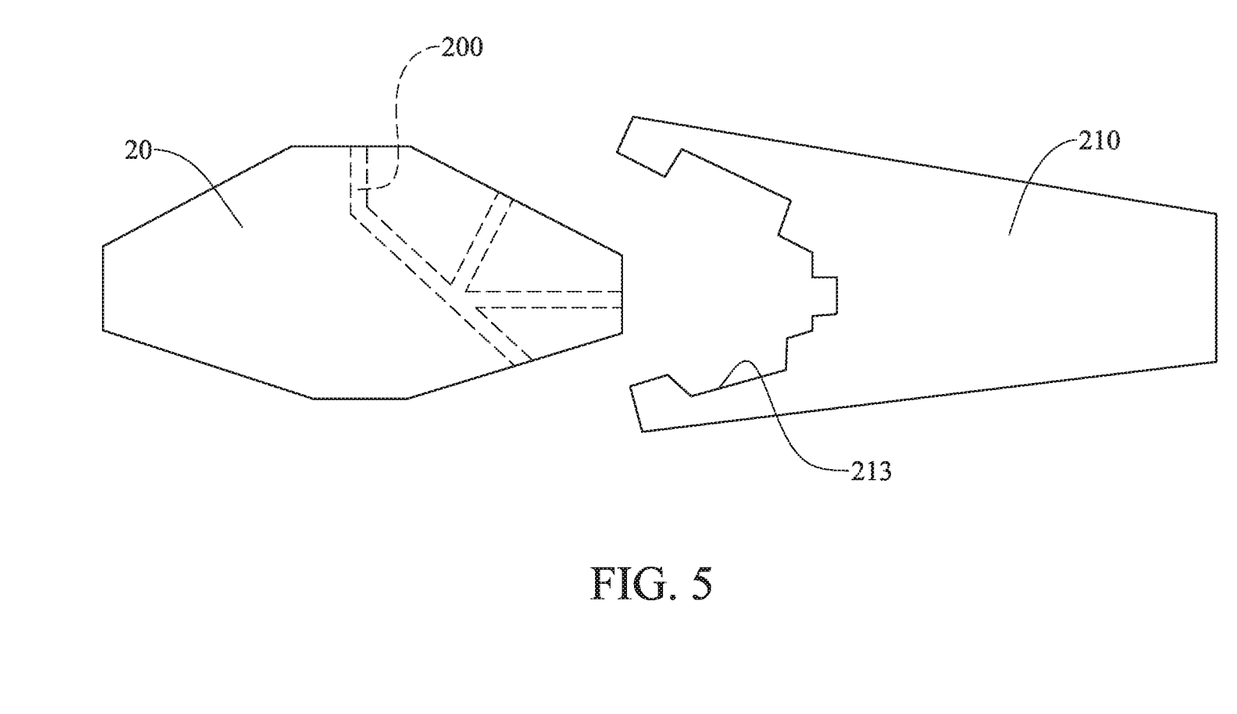
FIG. 5 is another schematic drawing showing the partial cross-sectional view of both the center float and the floating body of the separable buoy of the disclosure.

FIG. 3 is a schematic isometric drawing showing the developed view of the separable buoy of the second embodiment of the disclosure while FIG. 5 is another schematic drawing showing the partial cross-sectional view of both the center float and the floating body of the separable buoy of the disclosure. As shown in FIG. 3 and FIG. 5, if the wave energy or wave velocity stored in the wave, that is sensed by the sensing module 24, exceeds that of the tolerated limit of electric generator, the actuation module 22 will make the chamber 23 to be communicated with the atmosphere to balance the low-pressure chamber 23 with the atmospheric causing the separable float unit 21 and the center float 20 separate automatically from each other.

Referring again to FIG. 6, the separable buoy of the disclosure includes center float 32 and a separable float unit 30.

Figure 6:
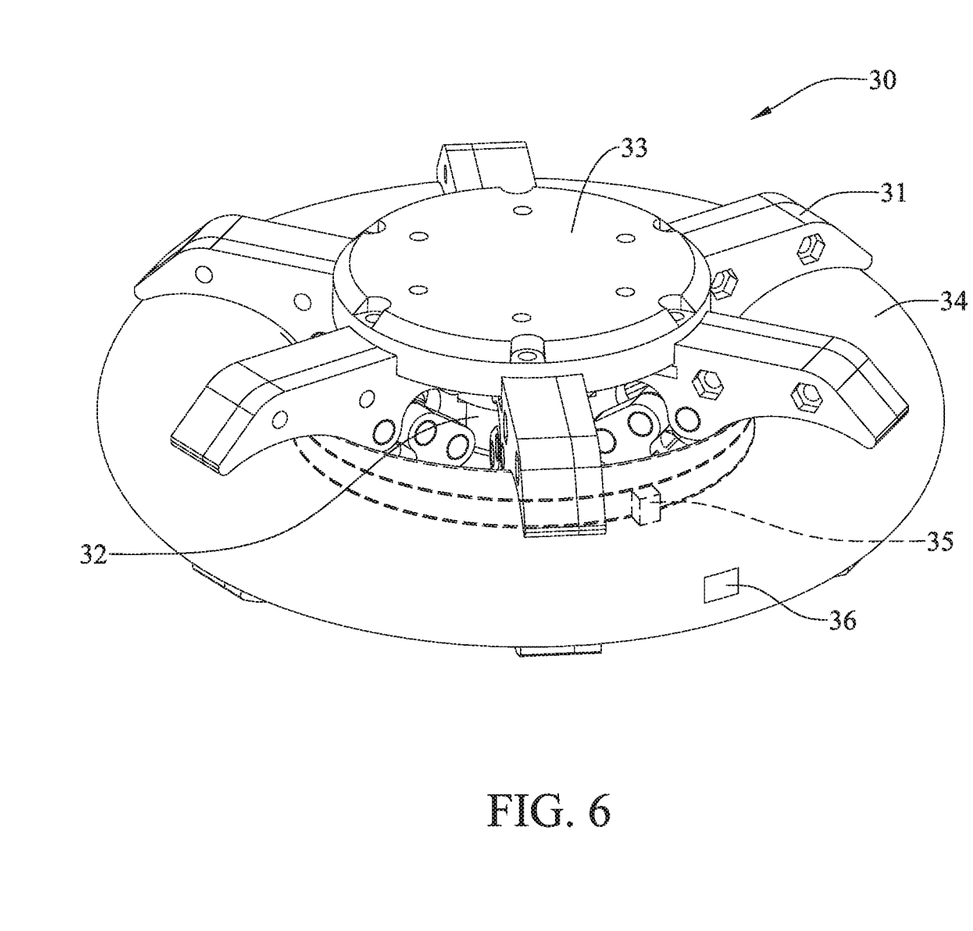
FIG. 6 is a schematic isometric drawing showing the outward appearance of the separable buoy of the third embodiment of the disclosure.

The separable float unit 30 includes at least a connecting module 31, a center plate 33, a floating body 34, an actuation module 36 and a sensing module 35.

Figure 7:
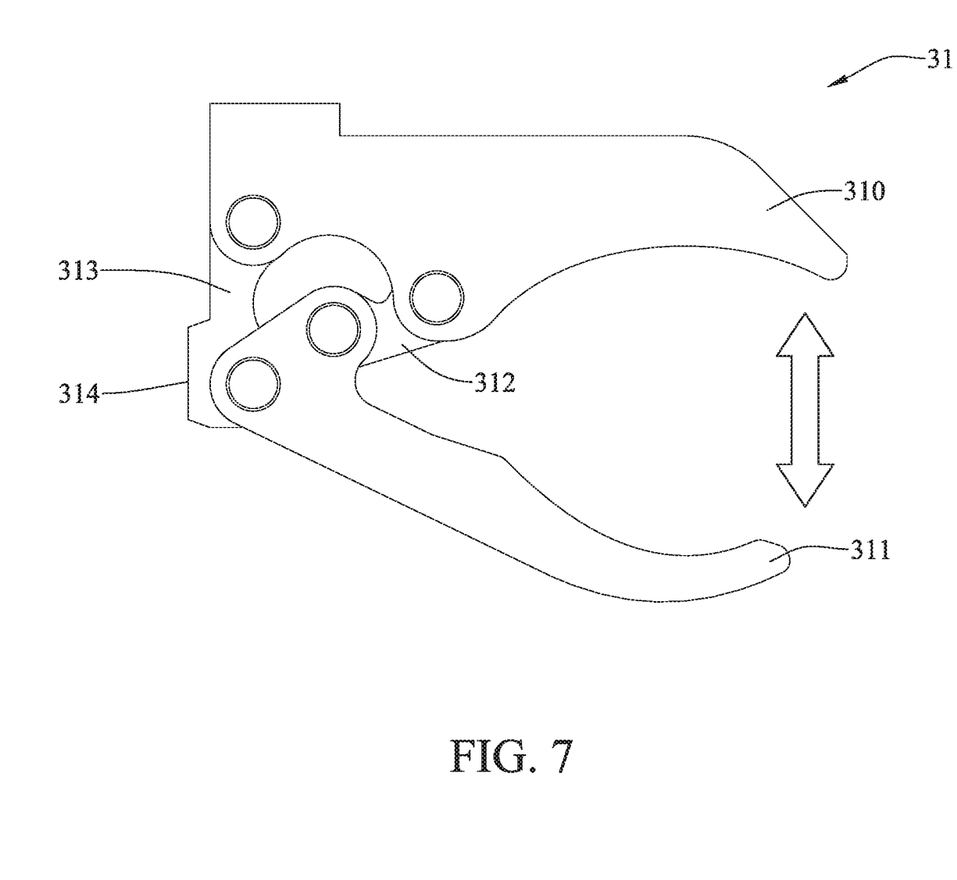
FIG. 7 is a schematic drawing of the connecting module of the separable buoy of the disclosure.

FIG. 6 is a schematic isometric drawing showing the outward appearance of the separable buoy of the third embodiment of the disclosure while FIG. 7 is a schematic drawing of the connecting module of the separable buoy of the disclosure As shown in FIG. 6 and FIG. 7, at least a connecting module 31 is a toggle mechanism having one end secure to the periphery of the center plate 33 and the other end connected to both a center float 32 and a floating body 34. The connecting module 31 has an upper jaw portion 310, a lower jaw portion 311, a connecting rod 312 and a leaning rod 313. The upper jaw portion 310 is pivotally connected to an end of the connecting rod 312 while the lower jaw portion 311 is pivotally connected to the other end of the connecting rod 312. Both ends of the leaning rod 313 are pivotally connected to the upper jaw portion 310 and the lower jaw portion 311 respectively.

The leaning rod 313 has a leaning surface 314. When the upper jaw portion 310 and the lower jaw portion 311 are propped to open, the leaning rod 313 is interlocked by the lower jaw portion 311 making the leaning rod 313 move in the direction that is away from the lower jaw portion 311, thereby, the leaning surface 314 will push to lean the article.

As depicted above, the floating body 34 is clamped by the connecting module 31, i.e. the floating body 34 is furnished between the upper jaw portion 310 and the lower jaw portion 311 making the upper jaw portion 310 and the lower jaw portion 311 prop to open and letting the leaning rod 313 move in the direction that is away from the lower jaw portion 311. At this time, at least a leaning surface 314 of a connecting module 31 is leaned against the side surface furnished at the center float 10, in this way, the center float 32 is secured in the separable float unit 30. Here, the floating body 34 can be an air bag or a deformable floating body.

Both the sensing module 35 and the actuation module 36 are furnished at the floating body 34 and the sensing module 35 are signally connected to the actuation module 36.

Referring again to FIG. 6 and FIG. 7, if the floating body 34 is a air bag or a deformable floating body and is in inflated state to make the connecting module 31 clamp the center float 32, holding by a connecting cable, the center float 32 and the separable float unit 30 can either float on the surface of the sea water or partially submerge in the sea water.

When the wave energy or wave velocity stored in the wave, that is sensed by the sensing module 35, exceeds that of the tolerated limit of electric generator, the actuation module 36 will release the air in the floating body 34 to the atmosphere to let the floating body 34 deform. Under the influence of the deformation of the floating body 34, the lower jaw portion 311 moves in the direction toward the upper jaw portion 310 making the leaning rate become lower, of the leaning surface 314 that leans against the center float 32, thereby, making the connecting module 31 unable to clamp the center float 32 and thus making the center float 32 and the separable float unit 30 separate each other.

As depicted above, the mode that the actuation module 36 has the air in the floating body 34 release to the atmosphere is either a pop-open floating body 34 or valve bleeding.

Figure 8:
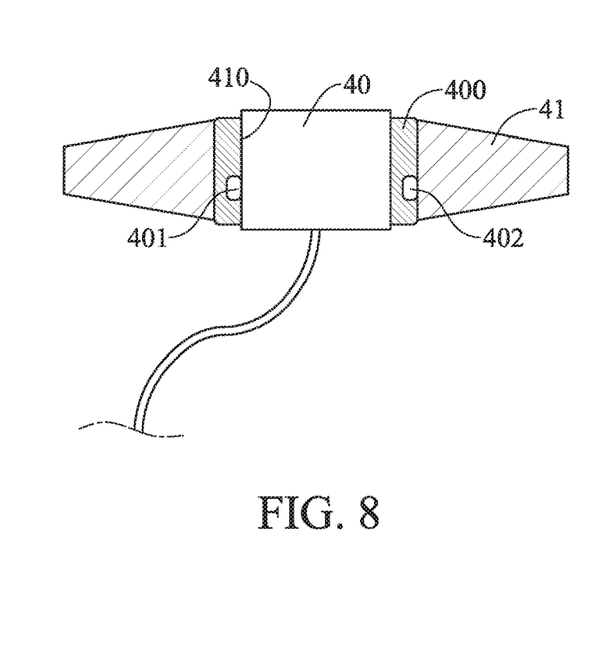
FIG. 8 is a schematic cross-sectional drawing of the deformable connecting ring of the separable buoy of the fourth embodiment of the disclosure.
Figure 9:
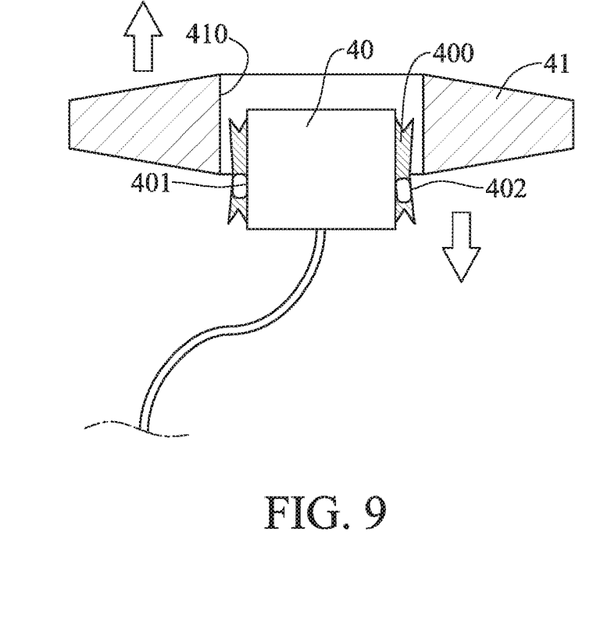
FIG. 9 is a schematic cross-sectional drawing of the deformable connecting ring showing the action of the separable buoy of the fourth embodiment of the disclosure.
Figure 10:
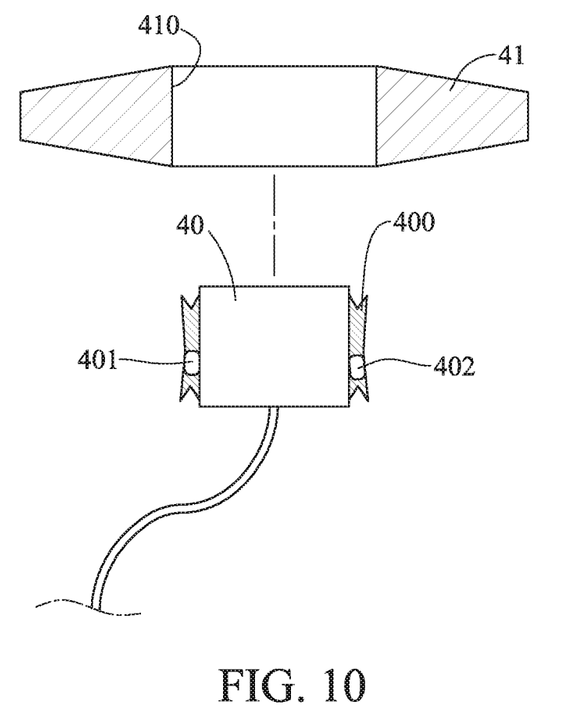
FIG. 10 is a schematic cross-sectional drawing of the deformable connecting ring showing another action of the separable buoy of the fourth embodiment of the disclosure.

FIG. 8 is a schematic cross-sectional drawing of the deformable connecting ring of the separable buoy of the fourth embodiment of the disclosure; FIG. 9 is a schematic cross-sectional drawing of the deformable connecting ring showing the action of the separable buoy of the fourth embodiment of the disclosure; FIG. 10 is a schematic cross-sectional drawing of the deformable connecting ring showing another action of the separable buoy of the fourth embodiment of the disclosure. As shown in FIG. 8, FIG. 9, and FIG. 10, the separable buoy of the disclosure includes center float 40 and a separable float unit 41.

The center float 40 includes a deformable connecting ring 400, a sensing module 401 and a actuation module 402 where the deformable connecting ring 400 is furnished at the periphery side of the center float 40. The sensing module 401 being furnished at the center float 40 is signally connected to actuation module 402 which is furnished at the deformable connecting ring 400. The actuation module 402 is an actuator, an air-discharge valve or an electromagnetic valve.

The separable float unit 41 has a containing hole 410. An end of the deformable connecting ring 400 is connected to center float 40 and the other end thereof is connected to is leaned against the inner wall of the containing hole 410 making the center float 40 secure in separable float unit 41.

Referring again to As shown in FIG. 9 and FIG. 10, if the wave energy or wave velocity stored in the wave, that is sensed by the sensing module 401, exceeds that of the tolerated limit of electric generator, the actuation module 402 will make the deformable connecting ring 400 deform to so as to make the deformable connecting ring 400 unable to lean against the inner wall of the containing hole 410 and let the center float 40 and the separable float unit 41 separate from each other.

If the deformable connecting ring 400 is an air-filling ring or an air-filling float, the actuation module 402 will make the deformable connecting ring 400 bleed so as to make the deformable connecting ring 400 deform, thereby, make the separable float unit 41 and the center float 40 separate from each other.

Figure 11:
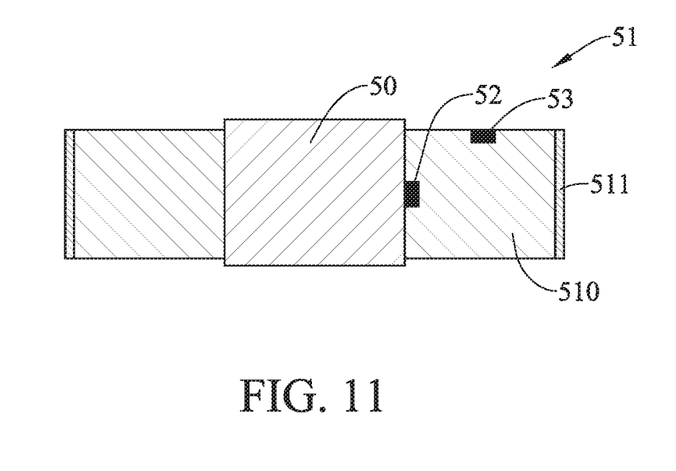
FIG. 11 is a schematic cross-sectional drawing of the floating bodies of the separable buoy of the fifth embodiment of the disclosure.
Figure 12:
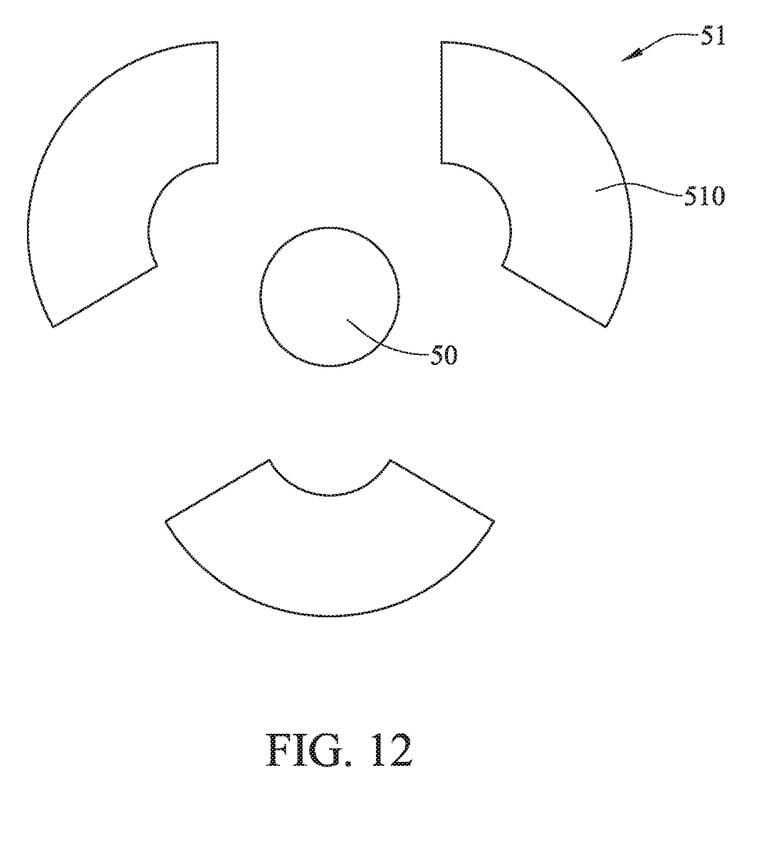
FIG. 12 is a schematic cross-sectional drawing showing the separating action of the floating bodies of the separable buoy of the fifth embodiment of the disclosure.

FIG. 11 is a schematic cross-sectional drawing of the floating bodies of the separable buoy of the fifth embodiment of the disclosure while FIG. 12 is a schematic cross-sectional drawing showing the separating action of the floating bodies of the separable buoy of the fifth embodiment of the disclosure. As shown in FIG. 11, and FIG. 12, the separable buoy of the disclosure includes center float 50 and a separable float unit 51.

The separable float unit 51 possesses a multiplicity of floating bodies 510. The floating bodies 510 are circumferentially furnished at the periphery side of the center float 50 so as to make the separable float unit 51 secure at the center float 50. The floating bodies 510 is an air bag or a deformable floating body.

A sensing module 52 being furnished at the center float 50 is signally connected to the actuation module 53.

If the wave energy or wave velocity stored in the wave, that is sensed by the sensing module 52, exceeds that of the tolerated limit of electric generator, the actuation module 53 will make the floating body 510 bleed so as to make the floating body 510 deform, thereby, make the hoop ring 511 separate from the floating body 510 and again make the center float 50 and the separable float unit 51 separate each other.

In summary, the separable buoy of the disclosure is a combination of a separable float unit and center float. When the wave energy or wave velocity stored in the wave exceeds that of the tolerated limit of electric generator, the separable float unit and the center float will be separated each other. By the use of this separation mode, the separable buoy of the disclosure can mitigate the wave force that is exerted to the wave generator and improve the safety performance.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents.

What is claimed is:
1. A separable buoy, comprising:
a center float having a top surface that includes an upper peripheral end and an engagement bevel provided on the upper peripheral end that extends below the top surface;
a separable float unit having a substantially circular circumference and detachably disposed at the center the separable float unit including a dome wall that is provided in a lower central portion thereof and that has a peripheral edge configured to detachably engage the engagement bevel: and a chamber defined between the dome wall of the separable float unit and the top surface of the center float when the separable float unit engages the center float, wherein the center float has a vertical height that substantially equals or exceeds that of a lower portion of the separable float unit, and wherein the circumference of the separable float unit substantially exceeds a circumference of the center float.

2. The separable buoy as claimed in claim 1, wherein the chamber has a pressure that is lower than external pressure and is a low-pressure chamber.

3. The separable buoy as claimed in claim 1, wherein the separable float unit comprises:

a floating body on whose lower central portion the dome wall is provided and that has at least one air hole that communicates with the dome wall and the chamber to admit external air into the chamber;

an actuation module disposed at the floating body; and a sensing module that is provided within the chamber either near a top portion of the chamber or on the top surface of the center float and that is signally connected to the actuation module.

4. The separable buoy as claimed in claim 3, wherein the sensing module is a pressure sensor or an accelerometer, wherein the actuation module is an active bleeding valve, a passive bleeding valve, an actuator, a bleeding valve, an explosive or an electromagnetic valve, and wherein the floating body has a rigid structure and is a rigid floating body.

5. The separable buoy as claimed in claim 3, wherein the actuation module is configured to close the at least one air hole to prevent external air from entering the chamber so that the chamber is maintained in a low-pressure state.

6. The separable buoy as claimed in claim 5, wherein the sensing module is a pressure sensor or an accelerometer, and wherein the actuation module is an active bleeding valve, a passive bleeding valve, an actuator, bleeding valve, an explosive or an electromagnetic valve.

7. The separable buoy as claimed in claim 5, wherein the separable float unit is circumferentially disposed at the center float and is connected to the center float by a connecting body, and wherein the separable float unit includes at least one floating body, and the at least one floating body is connected in series, respectively, by at least one connecting body.

8. The separable buoy as claimed in claim 7, wherein the connecting body is a cable or a metal chain connecting plate.

9. The separable buoy as claimed in claim 7, wherein the center float has defined therein a recess and, when the floating body engages the center float, the recess of the center float communicates with the at least one air hole and the recess become the chamber.

10. The separable buoy as claimed in claim 1, wherein the center float includes a plurality of air holes which communicate with the chamber, a sensing module, and an actuation module that is coupled with the plurality of air holes, and wherein the sensing module is signally connected to the actuation module.

11. The separable buoy as claimed in claim 10, wherein the actuation module is configured to close the plurality of air holes to prevent external air from entering the chamber so that the chamber is maintained in a low-pressure state.

\* \* \* \* \*